(12) United States Patent
Liu et al.

(10) Patent No.: US 10,383,070 B2
(45) Date of Patent: Aug. 13, 2019

(54) METHOD AND APPARATUS FOR TRANSMITTING SYNCHRONIZATION SIGNAL

(71) Applicant: Huawei Technologies Co., Ltd., Shenzhen (CN)

(72) Inventors: Deping Liu, Beijing (CN); Qiang Li, Shenzhen (CN); Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/411,223

(22) Filed: Jan. 20, 2017

(65) Prior Publication Data

US 2017/0135054 A1 May 11, 2017

Related U.S. Application Data

(63) Continuation of application No. PCT/CN2014/084035, filed on Aug. 8, 2014.

(30) Foreign Application Priority Data

Jul. 21, 2014 (WO) ................ PCT/CN2014/082612

(51) Int. Cl.
*H04W 56/00* (2009.01)
*H04W 76/14* (2018.01)
(Continued)

(52) U.S. Cl.
CPC ..... *H04W 56/001* (2013.01); *H04W 56/0015* (2013.01); *H04W 76/14* (2018.02); *H04W 8/005* (2013.01); *H04W 92/18* (2013.01)

(58) Field of Classification Search
None
See application file for complete search history.

(56) References Cited

U.S. PATENT DOCUMENTS 9,681,472 B2 * 6/2017 Sorrentino ........ H04W 56/0025
9,893,855 B2 * 2/2018 Kim .................... H04W 76/14
(Continued)

FOREIGN PATENT DOCUMENTS

CN 103108405 A 5/2013
CN 103250435 A 8/2013
(Continued)

OTHER PUBLICATIONS

"Synchronization Procedures for D2D Discovery and Communication." 3GPP TSG RAN WG1 Meeting #76bis, Shenzhen, China, R1-141381, 3$^{rd}$ Generation Partnership Project, Valbonne, France (Mar. 31-Apr. 4, 2014).
(Continued)

*Primary Examiner* — Michael J Moore, Jr.
(74) *Attorney, Agent, or Firm* — Leydig, Voit & Mayer, Ltd.

(57) ABSTRACT

Embodiments of the present invention disclose a method and an apparatus for transmitting a synchronization signal. The method of the present invention includes: determining, by a first terminal, a D2D type, where the D2D type includes D2D discovery and D2D communication; and transmitting, by the first terminal, a synchronization signal according to the determined D2D type. Therefore, synchronization signals transmitted by terminals of different D2D types do not affect each other, avoiding that a second terminal detects and receives a synchronization signal that does not correspond to a D2D type of the second terminal and ensuring that user direct-connection communication can be performed correctly and efficiently.

22 Claims, 3 Drawing Sheets

(51) Int. Cl.
*H04W 92/18* (2009.01)
*H04W 8/00* (2009.01)

(56) References Cited

U.S. PATENT DOCUMENTS

| | | | |
|---|---|---|---|
| 9,918,290 B2* | 3/2018 | Li | H04W 76/14 |
| 9,930,631 B2* | 3/2018 | Yang | H04W 56/002 |
| 10,015,828 B2* | 7/2018 | Sorrentino | H04W 56/0025 |
| 2007/0270139 A1 | 11/2007 | Jendbro et al. | |
| 2013/0308625 A1 | 11/2013 | Park et al. | |
| 2014/0256369 A1* | 9/2014 | Ji | H04W 76/021 |
| | | | 455/500 |
| 2014/0323126 A1* | 10/2014 | Ro | H04W 8/005 |
| | | | 455/434 |
| 2015/0043398 A1* | 2/2015 | Fwu | H04W 76/14 |
| | | | 370/280 |
| 2015/0080040 A1 | 3/2015 | Chang | |
| 2015/0215982 A1* | 7/2015 | Siomina | H04W 76/14 |
| | | | 370/328 |
| 2015/0264588 A1* | 9/2015 | Li | H04W 56/0015 |
| | | | 370/350 |
| 2015/0327180 A1* | 11/2015 | Ryu | H04L 1/00 |
| | | | 370/329 |
| 2015/0327201 A1* | 11/2015 | He | H04W 48/16 |
| | | | 370/336 |
| 2015/0382324 A1* | 12/2015 | Sheng | H04W 72/02 |
| | | | 370/329 |
| 2016/0234670 A1* | 8/2016 | Zhang | H04W 8/005 |
| 2016/0242065 A1* | 8/2016 | Fukuta | H04W 72/04 |
| 2016/0337839 A1* | 11/2016 | Chae | H04W 76/14 |
| 2016/0374038 A1 | 12/2016 | Wang | |
| 2017/0126306 A1* | 5/2017 | Kim | H04B 7/15507 |
| 2017/0135074 A1* | 5/2017 | Yi | H04W 8/005 |
| 2017/0142741 A1* | 5/2017 | Kaur | H04W 56/002 |
| 2017/0188321 A1* | 6/2017 | Matsumoto | H04W 92/18 |
| 2017/0215203 A1* | 7/2017 | Lee | H04J 11/00 |
| 2017/0332339 A1* | 11/2017 | Yoon | H04W 56/0015 |

FOREIGN PATENT DOCUMENTS

| | | |
|---|---|---|
| CN | 103379617 A | 10/2013 |
| CN | 103582077 A | 2/2014 |
| CN | 103686985 A | 3/2014 |
| CN | 103828398 A | 5/2014 |
| CN | 103889071 A | 6/2014 |
| CN | 201480080784.1 | 3/2019 |
| EP | 2858422 A1 | 4/2015 |
| EP | 2925067 A1 | 9/2015 |
| RU | 2415514 C2 | 3/2011 |
| WO | 2013174154 A1 | 11/2013 |
| WO | WO 2013174154 A1 | 11/2013 |
| WO | WO 2014070058 A1 | 5/2014 |
| WO | 2014175712 A1 | 10/2014 |

OTHER PUBLICATIONS

"3$^{rd}$ Generation Partnership Project; Technical Specification Group Radio Access Network; Evolved Universal Terrestrial Radio Access (E-UTRA); Physical layer procedures (Release 12)," 3GPP TS 36.213, V12.2.0, 3$^{rd}$ Generation Partnership Project, Valbonne, France (Jun. 2014).
RU 2017105066, Office Action and Search Report, Apr. 3, 2018.
AU 2014401578, Office Action, Aug. 2, 2018.
"Synchronization Signals and Channel Design for D2D Discovery and Communication," 3GPP TSG RAN WG1 Meeting #76bis R1-141380,Shenzhen, China, pp. 1-9, 3rd Generation Partnership Project—Valbonne, France Mar. 31-Apr. 4, 2014).

* cited by examiner

METHOD AND APPARATUS FOR TRANSMITTING SYNCHRONIZATION SIGNAL

CROSS-REFERENCE TO RELATED APPLICATIONS

This application is a continuation of International Application No. PCT/CN2014/084035, filed on Aug. 8, 2014, which claims priority to International Application No. PCT/CN2014/082612, filed on Jul. 21, 2014. The disclosures of the aforementioned applications are hereby incorporated by reference in their entireties.

TECHNICAL FIELD

The present invention relates to the field of communications technologies, and in particular, to a method and an apparatus for transmitting a synchronization signal.

BACKGROUND

In conventional Long Term Evolution (LTE for short) communications technologies, signaling and data exchange between user terminals (full name: user equipment, UE for short) needs to pass through an evolved NodeB (eNB for short or base station) to which each terminal belongs.

In user direct-connection communication (that is, device to device, D2D for short) that is used as a direct communications technology, data exchange between UEs does not need to be forwarded by using an eNB, the exchange can be directly performed between the UEs, or the exchange is directly performed under the assistance of a network.

However, synchronization signals transmitted by UEs that perform user direct-connection communication affect each other, causing poor quality of communication or even a communication failure.

SUMMARY

Embodiments of the present invention provide a method and an apparatus for transmitting a synchronization signal, to improve quality of communication.

To achieve the foregoing objective, the following technical solutions are used in the embodiments of the present invention:

According to a first aspect, an embodiment of the present invention provides a method for transmitting a synchronization signal, and the method includes:

determining, by a first terminal, a D2D type, where the D2D type includes D2D discovery and D2D communication; and transmitting, by the first terminal, a synchronization signal according to the determined D2D type.

With reference to the first aspect, in a first possible implementation manner, the method further includes:

when the first terminal is inside a network coverage area, receiving, by the first terminal, configuration information of a system, where the configuration information includes resource information that is configured by the system and of the synchronization signal, and an indication for sending the synchronization signal.

With reference to the first aspect or the first possible implementation manner of the first aspect, in a second possible implementation manner, the given time is a preset moment set or time period set.

With reference to the first aspect or the first possible implementation manner of the first aspect, in a third possible implementation manner, when the configuration information includes the indication for sending the synchronization signal, the transmitting, by the first terminal, a synchronization signal according to the D2D type includes: transmitting, by the first terminal, on a resource that is configured by the system and of the synchronization signal, the synchronization signal according to a correspondence between the determined D2D type and the resource that is configured by the system and of the synchronization signal.

With reference to the first aspect or the first possible implementation manner of the first aspect, in a fourth possible implementation manner of the first aspect, when the configuration information includes the indication for sending the synchronization signal, the transmitting, by the first terminal, a synchronization signal according to the D2D type includes: transmitting, by the first terminal, on a resource that is configured by the system and of the synchronization signal, the synchronization signal according to a correspondence between the determined D2D type and a synchronization signal.

With reference to the first aspect or the first possible implementation manner of the first aspect, in a fifth possible implementation manner of the first aspect, when the configuration information includes the indication for sending the synchronization signal, the transmitting, by the first terminal, a synchronization signal according to the D2D type includes: transmitting, by the first terminal, on a resource that is configured by the system and of the synchronization signal, the synchronization signal according to a correspondence between the determined D2D type and the resource that is configured by the system and of the synchronization signal and a synchronization signal.

With reference to the first aspect or the first to the fifth possible implementation manners of the first aspect, in a sixth possible implementation manner, the synchronization signal includes: a D2D synchronization signal; or a D2D synchronization signal and a physical D2D synchronization channel; where the D2D synchronization signal includes a primary D2D synchronization signal and a secondary D2D synchronization signal.

According to a second aspect, an embodiment of the present invention provides a method for receiving a synchronization signal, and the method includes:

determining, by a second terminal, a D2D type, where the D2D type includes D2D discovery and D2D communication; and detecting and receiving, by the second terminal, a synchronization signal according to the determined D2D type.

With reference to the second aspect, in a first possible implementation manner of the second aspect, the detecting and receiving, by the second terminal, a synchronization signal according to the determined D2D type includes:

when the second terminal is inside a network coverage area, detecting a synchronization signal of an adjacent cell and/or a synchronization signal transmitted by a terminal that is outside the network coverage area; or when the second terminal is outside a network coverage area, detecting a synchronization signal transmitted by a terminal that is inside the network coverage area and/or a synchronization signal transmitted by a terminal that is outside the network coverage area.

With reference to the second aspect or the first possible implementation manner of the second aspect, in a second possible implementation manner, the method includes: receiving, by the second terminal, resource information that is configured by a system of the adjacent cell and of the synchronization signal.

With reference to the second aspect or the first and the second possible implementation manners of the second aspect, in a third possible implementation manner, the method further includes:

transmitting or receiving, by the second terminal according to the determined D2D type and the detected and received synchronization signal, a signal corresponding to the D2D type.

With reference to the second aspect or the first to the third possible implementation manners, in a fourth possible implementation manner of the second aspect, the synchronization signal includes:

a D2D synchronization signal; or a D2D synchronization signal and a physical D2D synchronization channel;

where the D2D synchronization signal includes a primary D2D synchronization signal and a secondary D2D synchronization signal.

With reference to the second aspect or the first to the fourth possible implementation manners of the second aspect, in a fifth possible implementation manner, the detecting and receiving, by the second terminal, a synchronization signal according to the determined D2D type includes:

detecting and receiving, by the second terminal, the synchronization signal according to a predefined correspondence between a D2D type and a synchronization signal.

With reference to the second aspect or the first to the fifth possible implementation manners of the second aspect, in a sixth possible implementation manner, the detecting and receiving, by the second terminal, a synchronization signal according to the determined D2D type includes:

when the second terminal is inside the network coverage area, detecting and receiving the synchronization signal according to the determined D2D type, a cell identity of the adjacent cell, and a correspondence between the cell identity of the adjacent cell and a synchronization signal.

With reference to the second aspect or the first to the sixth possible implementation manners of the second aspect, in a seventh possible implementation manner, the detecting and receiving, by the second terminal, a synchronization signal according to the determined D2D type includes:

when the second terminal is inside the network coverage area, detecting and receiving the synchronization signal according to the determined D2D type and an identity of the synchronization signal of the adjacent cell.

According to a third aspect, an embodiment of the present invention provides an apparatus for transmitting a synchronization signal, and the apparatus includes:

a processing module, configured to determine a D2D type, where the D2D type includes D2D discovery and D2D communication; and a sending module, configured to transmit a synchronization signal according to the D2D type determined by the processing module.

With reference to the third aspect, in a first possible implementation manner of the third aspect, the apparatus further includes:

a receiving module, configured to: when the apparatus is inside a network coverage area, receive configuration information of a system, where the configuration information includes resource information that is configured by the system and of the synchronization signal, and an indication for sending the synchronization signal.

With reference to the third aspect or the first possible implementation manner of the third aspect, in a second possible implementation manner of the third aspect, the sending module is specifically configured to: when the configuration information includes the indication for sending the synchronization signal, transmit, on a resource that is configured by the system and of the synchronization signal, the synchronization signal according to a correspondence between the D2D type determined by the processing module and a synchronization signal.

With reference to the third aspect or the second possible implementation manner of the third aspect, in a third possible implementation manner, the sending module is specifically configured to: when the configuration information includes the indication for sending the synchronization signal, transmit, on a resource that is configured by the system and of the synchronization signal, the synchronization signal according to a correspondence between the D2D type determined by the processing module and the resource that is configured by the system and of the synchronization signal and a synchronization signal.

With reference to the third aspect or the first possible implementation manner of the third aspect, in a fourth possible implementation manner of the third aspect, the sending module is specifically configured to: when the configuration information includes the indication for sending the synchronization signal, transmit, on a resource that is configured by the system and of the synchronization signal, the synchronization signal according to a correspondence between the D2D type determined by the processing module and a synchronization signal.

With reference to the third aspect or the first possible implementation manner of the third aspect, in a fifth possible implementation manner of the third aspect, the sending module is specifically configured to: when the configuration information includes the indication for sending the synchronization signal, transmit, on a resource that is configured by the system and of the synchronization signal, the synchronization signal according to a correspondence between the D2D type determined by the processing module and the resource that is configured by the system and of the synchronization signal and a synchronization signal.

With reference to the third aspect or the first possible implementation manner of the third aspect to the fifth possible implementation manner of the third aspect, in a sixth possible implementation manner, the synchronization signal includes: a D2D synchronization signal; or a D2D synchronization signal and a physical D2D synchronization channel; where the D2D synchronization signal includes a primary D2D synchronization signal and a secondary D2D synchronization signal.

According to a fourth aspect, an embodiment of the present invention provides an apparatus for receiving a synchronization signal, and the apparatus includes:

a processing module, configured to determine a D2D type, where the D2D type includes D2D discovery and D2D communication; and a receiving module, configured to detect and receive a synchronization signal according to the D2D type determined by the processing module.

With reference to the fourth aspect, in a first possible implementation manner of the fourth aspect, the receiving module is specifically configured to:

when the apparatus is inside a network coverage area, detect a synchronization signal of an adjacent cell and/or a synchronization signal transmitted by a terminal that is outside the network coverage area; or when the apparatus is outside a network coverage area, detect a synchronization signal transmitted by a terminal that is inside the network coverage area and/or a synchronization signal transmitted by a terminal that is outside the network coverage area.

With reference to the fourth aspect, in a second possible implementation manner of the fourth aspect, the receiving module is further configured to: receive resource information that is configured by a system of the adjacent cell and of the synchronization signal.

With reference to the fourth aspect or the first and the second possible implementation manners of the fourth aspect, in a third possible implementation manner of the fourth aspect, the apparatus further includes:

a sending module, configured to transmit, according to the D2D type determined by the processing module and the detected and received synchronization signal, a signal corresponding to the D2D type; or the receiving module, further configured to receive, according to the D2D type determined by the processing module and the detected and received synchronization signal, a signal corresponding to the D2D type.

With reference to the fourth aspect or the first to the third possible implementation manners of the fourth aspect, in a fourth possible implementation manner of the fourth aspect, the synchronization signal includes:

a D2D synchronization signal; or a D2D synchronization signal and a physical D2D synchronization channel;

where the D2D synchronization signal includes a primary D2D synchronization signal and a secondary D2D synchronization signal.

With reference to the fourth aspect or the first to the fourth possible implementation manners of the fourth aspect, in a fifth possible implementation manner of the fourth aspect, the receiving module is specifically configured to:

when inside the network coverage area, detect and receive the synchronization signal according to the determined D2D type, a cell identity of the adjacent cell, and a correspondence between the cell identity of the adjacent cell and a synchronization signal.

With reference to the fourth aspect or the first to the fifth possible implementation manners of the fourth aspect, in a sixth possible implementation manner of the fourth aspect, the receiving module is specifically configured to:

when inside the network coverage area, detect and receive the synchronization signal according to the determined D2D type and an identity of the synchronization signal of the adjacent cell.

For the method and apparatus for transmitting a synchronization signal provided in the embodiments of the present invention, a first terminal transmits a synchronization signal according to a D2D type, and a second terminal detects and receives, according to the D2D type, the synchronization signal transmitted by the first terminal. Compared with the prior art, in this solution, synchronization signals transmitted by terminals of different D2D types do not affect each other. The first terminal transmits the synchronization signal according to a determined D2D type, thereby reducing power of transmitting the synchronization signal; the second terminal detects and receives the synchronization signal according to the determined D2D type, so that the second terminal detects and receives only a synchronization signal that corresponds to the D2D type of the second terminal. For example, a terminal performing D2D discovery detects and receives a synchronization signal that corresponds to D2D discovery, and a terminal performing D2D communication detects and receives a synchronization signal that corresponds to D2D communication. This avoids that the second terminal detects and receives a synchronization signal that does not correspond to the D2D type of the second terminal, and therefore avoids that when subsequently performing user direct-connection communication, the second terminal transmits or receives a D2D signal of a wrong D2D type, improves efficiency of user direct-connection communication, reduces detection complexity of the second terminal, reduces detection power of the second terminal, and ensures that user direct-connection communication can be performed correctly and efficiently.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
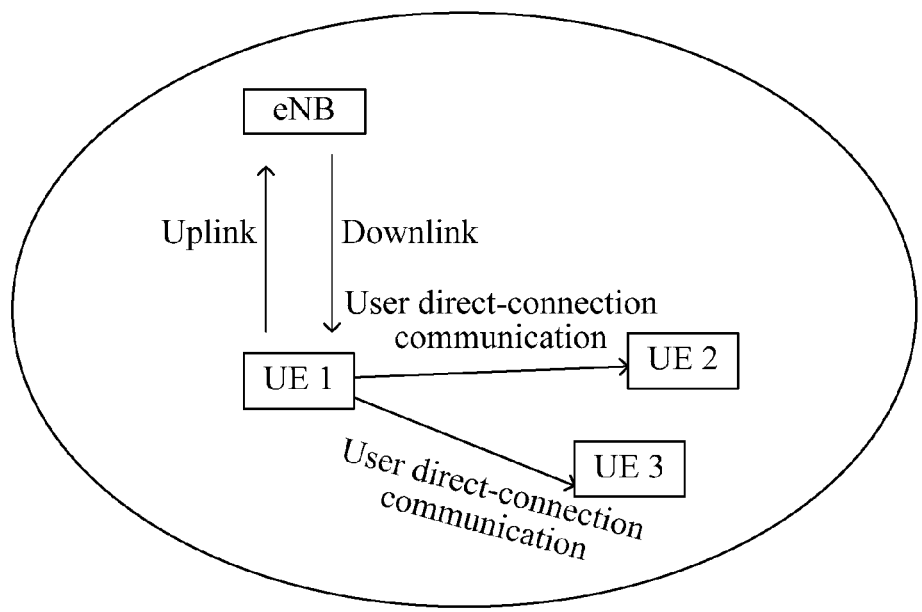
FIG. 1 is a schematic structural diagram of network communication according to the prior art of the present invention.

LTE-D2D is an LTE-based terminal direct-connection communications technology that is recently defined by the 3rd Generation Partnership Project (3GPP for short). The LTE-D2D communications technology adds D2D application to an existing LTE system, that is, there are both user direct-connection communication and LTE communication. As shown in FIG. 1, UE 1 may transmit data of user direct-connection communication to UE 2 and UE 3 to perform user direct-connection communication, and UE 1 may also perform communication with an eNB. A process in which UE 1 transmits communication data and the eNB receives the communication data is referred to as uplink communication. A process in which the eNB transmits communication data and UE 1 receives the communication data is referred to as downlink communication. Inter-UE communication, performed between UE 1, which is used as a party that transmits data, with UE 2 and UE 3, is user direct-connection communication.

There are three working scenarios for user direct-connection communication: with network coverage, without network coverage, and with partial network coverage. In a working scenario with network coverage, terminals that take part in user direct-connection communication are all inside a network coverage area. In a scenario without network coverage, terminals that take part in user direct-connection communication are all outside a network coverage area. In a scenario with partial network coverage, some terminals that take part in user direct-connection communication are inside a network coverage area, and the other terminals are outside the network coverage area.

Generally, synchronization needs to be first established between two parties of communication, and frequencies and timing of two devices are adjusted to a same frequency and time. For synchronization, a common synchronization reference needs to be specified between two terminals in communication, and a synchronization source refers to a device that provides the synchronization reference. In the working scenario with network coverage, a base station in a network is used as a synchronization source in the prior art, and terminals that are synchronized with the base station form a group. In the working scenario without network coverage, one terminal or all terminals in multiple terminals without network coverage are used as synchronization sources in the prior art, and other terminals that are synchronized to one synchronization source form a group. In the working scenario with partial network coverage, some terminals are inside the network coverage area, and the other terminals are outside the network coverage area, and a terminal under the network coverage transmits a synchronization signal as a synchronization reference for terminals that are outside the network coverage area.

User direct-connection communication includes two main application modes/types: D2D discovery (discovery) and D2D communication (communication).

D2D discovery refers to that a terminal sends a discovery message (discovery message), and other terminals read the discovery message to obtain information about the transmit terminal, for example, the discovery message includes identity information (identity) of the terminal, or the like.

D2D communication refers to that a terminal sends scheduling assignment (SA) information and data, and other terminals read the SA information to obtain information such as a transmission format of subsequent data, so as to correctly receive subsequent data information. The SA information, a data transmission format scheduled by the SA information, and adopted resources of the SA information, and the like may be scheduled together by a base station (that is, mode1 of D2D communication), or may be determined by a transmit terminal (that is, mode2 of D2D communication).

At present, D2D communication may be used in the foregoing three scenarios, while D2D discovery only relates to the working scenario with network coverage. However, a D2D type and a corresponding working scenario are not limited in this solution.

A terminal under network coverage transmits a synchronization signal (D2DSS and/or PD2DSCH), so that a terminal that is in the working scenario with partial network coverage and outside a network coverage area can capture synchronization, so as to establish synchronization with the terminal inside the network coverage area and to perform user direct-connection communication (D2D discovery and/or D2D communication). Similarly, when cells are asynchronous, inter-cell (inter-cell) terminals in a working scenario with network coverage may also detect and receive synchronization, so as to correctly receive user direct-connection communication information (D2D discovery information and/or D2D communication information) sent by a terminal of an adjacent cell.

The technical solution provided in the embodiments of the present invention may be applied to the forgoing working scenario with partial network coverage, and a case of inter-cell D2D communication or D2D discovery in a scenario with network coverage, for example, a case in which cells are asynchronous.

A terminal inside a network coverage area transmits a synchronization signal, and a terminal that needs to acquire synchronization, for example, a terminal of an asynchronous adjacent cell, or a terminal that is outside network coverage in a working scenario with partial network coverage, captures synchronization through searching.

In a scenario with partial network coverage, some terminals that perform user direct-connection communication (D2D communication and/or D2D discovery) are inside a network coverage area, and the other terminals are outside the network coverage area. D2D communication in user direct-connection communication is used as an example below. A first terminal in D2D communication inside a network coverage area transmits a synchronization signal that corresponds to D2D communication, where a synchronization reference of the first terminal comes from a serving cell of the first terminal. A second terminal in D2D communication outside the network coverage area detects and receives the synchronization signal that corresponds to D2D communication and the second terminal is indirectly synchronized to a network, and then obtains, according to a PD2DSCH, information such as configuration information, by the network, for a system in D2D communication, and a D2D frame number (D2D frame number). The second terminal outside the network coverage area then performs communication with a terminal inside the network coverage area according to a configuration, by the network, for D2D communication. Similarly, a first terminal inside a network coverage area transmits a synchronization signal, a second terminal inside the network coverage area and in an asynchronous adjacent cell detects and receives the synchronization signal, and is indirectly synchronized to a cell in which the first terminal that transmits the captured synchronization signal is located, and then a D2D discovery message is searched for according to information such as configuration information (which is delivered by the cell in which the second terminal is located or obtained by a PD2DSCH) for D2D discovery of the cell in which the first terminal is located, a D2D frame number (D2D frame number).

D2D communication and D2D discovery may be independent of each other, and are not the basis for each other.

For example, a cell may only have a terminal that performs D2D discovery, or only have a terminal that performs D2D communication.

If a synchronization signal transmitted by a terminal that is inside a network coverage area does not distinguish a D2D type (D2D discovery and D2D communication), D2D discovery is used as an example below: An objective of a terminal in a cell that performs D2D discovery is to detect a terminal (in an asynchronous adjacent cell or outside the network coverage area) that performs D2D discovery; however, it is very likely that a synchronization signal transmitted by a terminal (in an adjacent cell or outside the network coverage area) that performs D2D communication is detected, while a terminal performing D2D discovery does not need to acquire information about D2D communication, and the information about D2D communication even interferes with normal performance of D2D discovery, causing a severe fault during subsequent D2D discovery. D2D communication is used as an example below: Similarly, an objective of a terminal in D2D communication outside the network coverage area is to detect and receive a synchronization signal transmitted by a terminal in D2D communication inside the network coverage area; however it is very likely that a synchronization signal transmitted by a terminal that is inside the network coverage area and performs D2D discovery is detected, while the terminal outside the network coverage that performs D2D communication does not need to obtain the information about D2D discovery of a cell, and the information about D2D discovery even interferes with normal performance of D2D communication, causing a severe fault during subsequent D2D communication.

The technical solution provided in the embodiments of the present invention resolves the foregoing problem that synchronization signals transmitted by a terminal that performs discovery and a terminal that performs communication affect each other, which causes that subsequent D2D discovery or D2D communication cannot be performed normally or cannot be performed efficiently.

Figure 2:
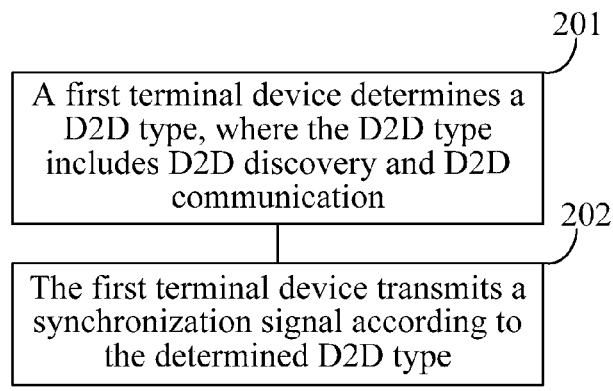
FIG. 2 is a schematic structural diagram of a method for transmitting a synchronization signal according to an embodiment of the present invention.

FIG. 2 shows a method for transmitting a synchronization signal according to an embodiment of the present invention. As shown in FIG. 2, the method includes:

201: A first terminal determines a D2D type, where the D2D type includes D2D discovery and D2D communication.

202: The first terminal transmits a synchronization signal according to the determined D2D type.

Further, when the first terminal is inside a network coverage area, the first terminal receives configuration information of a system, where the configuration information includes resource information that is configured by the system and of the synchronization signal, and an indication for sending the synchronization signal.

When the configuration information includes the indication for sending the synchronization signal, the transmitting, by the first terminal, a synchronization signal according to the D2D type includes:

transmitting, by the first terminal, on a resource that is configured by the system and of the synchronization signal, the synchronization signal according to a correspondence between the determined D2D type and the resource that is configured by the system and of the synchronization signal.

When the configuration information includes the indication for sending the synchronization signal, the transmitting, by the first terminal, a synchronization signal according to the D2D type includes:

transmitting, by the first terminal, on a resource that is configured by the system and of the synchronization signal, the synchronization signal according to a correspondence between the determined D2D type and a synchronization signal.

When the configuration information includes the indication for sending the synchronization signal, the transmitting, by the first terminal, a synchronization signal according to the D2D type includes:

transmitting, by the first terminal, on a resource that is configured by the system and of the synchronization signal, the synchronization signal according to a correspondence between the determined D2D type and the resource that is configured by the system and of the synchronization signal and a synchronization signal.

The synchronization signal includes:

a D2D synchronization signal; or a D2D synchronization signal and a physical D2D synchronization channel;

where the D2D synchronization signal includes a primary D2D synchronization signal and a secondary D2D synchronization signal.

Compared with the prior art, in this embodiment of the present invention, synchronization signals transmitted by terminals of different D2D types do not affect each other. This avoids that a second terminal detects and receives a synchronization signal that does not correspond to a D2D type of the second terminal, and therefore avoids that when performing user direct-connection communication subsequently, the second terminal transmits or receives a D2D signal of a wrong D2D type, improves efficiency of user direct-connection communication, reduces detection complexity of the second terminal, reduces detection power of the second terminal, and ensures that user direct-connection communication can be performed correctly and efficiently.

Figure 3:
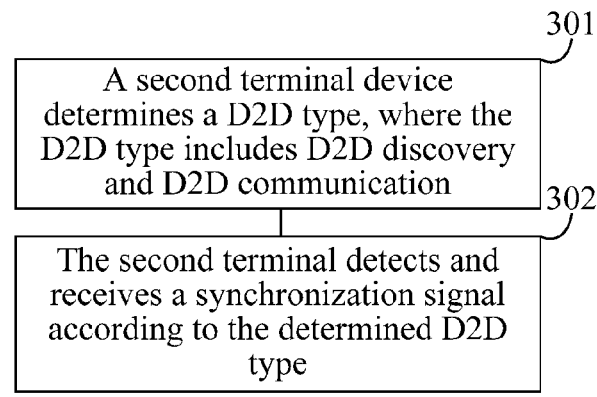
FIG. 3 is a schematic structural diagram of a method for receiving a synchronization signal according to an embodiment of the present invention.

FIG. 3 shows a method for receiving a synchronization signal according to an embodiment of the present invention. As shown in FIG. 3, the method includes:

301: A second terminal determines a D2D type, where the D2D type includes D2D discovery and D2D communication.

302: The second terminal detects and receives a synchronization signal according to the determined D2D type.

The detecting and receiving, by the second terminal, a synchronization signal according to the determined D2D type includes:

when the second terminal is inside a network coverage area, detecting a synchronization signal of an adjacent cell and/or a synchronization signal transmitted by a terminal that is outside the network coverage area; or when the second terminal is outside a network coverage area, detecting a synchronization signal transmitted by a terminal that is inside the network coverage area and/or a synchronization signal transmitted by a terminal that is outside the network coverage area.

Further, the second terminal receives resource information that is configured by a system of the adjacent cell and of the synchronization signal.

Further, the second terminal transmits or receives, according to the determined D2D type and the detected and received synchronization signal, a signal corresponding to the D2D type.

The synchronization signal includes:

a D2D synchronization signal; or a D2D synchronization signal and a physical D2D synchronization channel;

where the D2D synchronization signal includes a primary D2D synchronization signal and a secondary D2D synchronization signal.

The detecting and receiving, by the second terminal, a synchronization signal according to the determined D2D type includes:

detecting and receiving, by the second terminal, the synchronization signal according to a predefined correspondence between a D2D type and a synchronization signal.

The detecting and receiving, by the second terminal, a synchronization signal according to the determined D2D type includes:

when the second terminal is inside the network coverage area, detecting and receiving the synchronization signal according to the determined D2D type, a cell identity of the adjacent cell, and a correspondence between the cell identity of the adjacent cell and a synchronization signal.

The detecting and receiving, by the second terminal, a synchronization signal according to the determined D2D type includes:

when the second terminal is inside the network coverage area, detecting and receiving the synchronization signal according to the determined D2D type and an identity of the synchronization signal of the adjacent cell.

Compared with the prior art, in this embodiment of the present invention, synchronization signals transmitted by terminals of different D2D types do not affect each other. This avoids that a second terminal detects and receives a synchronization signal that does not correspond to a D2D type of the second terminal, and therefore avoids that when performing user direct-connection communication subsequently, the second terminal transmits or receives a D2D signal of a wrong D2D type, improves efficiency of user direct-connection communication, reduces detection complexity of the second terminal, reduces detection power of the second terminal, and ensures that user direct-connection communication can be performed correctly and efficiently.

Figure 4:
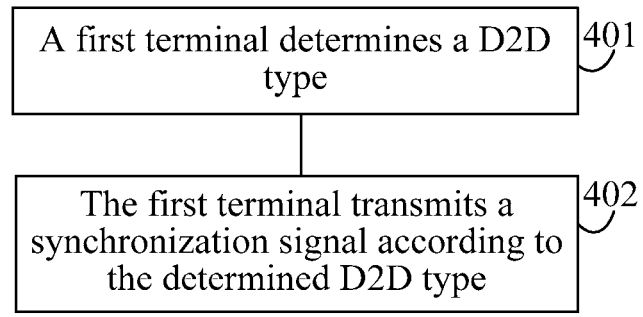
FIG. 4 is a schematic structural diagram of another method for transmitting a synchronization signal according to an embodiment of the present invention.

FIG. 4 shows another method for sending a synchronization signal according to an embodiment of the present invention. As shown in FIG. 4, the method includes:

401: A first terminal determines a D2D type.

The D2D type may include D2D discovery (discovery) and D2D communication (communication). A user terminal may determine the D2D type according to an upper-layer service type. For example, if the service type is a public security service, the terminal may determine that the D2D type is D2D communication. If the service type is other business applications, the terminal may determine that the D2D type is D2D discovery. Certainly, the service type is only an example of the present invention, and the present invention includes, but is not limited to, the example. Alternatively, a user may set, according to an interest, a terminal to take part in D2D discovery and/or D2D communication; or a D2D type that the terminal takes part in is preset, or is selected randomly, or the like.

402: The first terminal transmits a synchronization signal according to the determined D2D type.

The synchronization signal may include a D2D synchronization signal (D2DSS) or a D2D synchronization signal and a physical D2D synchronization channel (PD2DSCH), where the D2DSS may include a primary D2D synchronization signal (PD2DSS) and a secondary D2D synchronization signal (SD2DSS). Certainly, this is only an example given in this embodiment of the present invention, and the synchronization signal in the present invention includes, but is not limited to, the foregoing example.

In an embodiment, the D2D type and the D2DSS are in a one-to-one correspondence, and specifically, any one of the following manners may be used:

(1) The D2D type and quantities of PD2DSSSs and SD2DSSs are in a one-to-one correspondence, specifically:

For example, when the D2D type is D2D discovery, the first terminal transmits three PD2DSSSs and three SD2DSSs; when the D2D type is D2D communication, the first terminal transmits two PD2DSSSs and two SD2DSSs. For another example, when the D2D type is D2D discovery, the first terminal transmits one PD2DSSS and two SD2DSSs; when the D2D type is D2D communication, the first terminal transmits two PD2DSSSs and three SD2DSSs. There are many possibilities for different quantities of PD2DSSSs and SD2DSSs, and examples are only given here. All one-to-one correspondences between the D2D type and the quantities of PD2DSSSs and/or SD2DSSs are included in this embodiment.

(2) The D2D type and a relative position of the PD2DSSS and the SD2DSS are in a one-to-one correspondence, where the D2D type and a quantity of time symbols between the PD2DSSS and the SD2DSS are in a one-to-one correspondence.

For example, when the D2D type is D2D discovery, there are two time symbols between the PD2DSSS and the SD2DSS that are transmitted by the first terminal; when the D2D type is D2D communication, there are three time symbols between the PD2DSSS and the SD2DSS that are transmitted by the first terminal. For another example, quantities of time symbols between the PD2DSSS and the SD2DSS that are transmitted by the first terminal are the same; if one PD2DSS and one SD2DSS form a PD2DSSS-SD2DSS pair, a quantity of time symbols between each PD2DSSS-SD2DSS pair when the D2D type is D2D discovery is different from a quantity of time symbols between each PD2DSSS-SD2DSS pair when the D2D type is D2D communication. For example, when the D2D type is D2D discovery, there are three time symbols between each PD2DSSS-SD2DSS pair of the first terminal; when the D2D type is D2D communication, there are five time symbols between each PD2DSSS-SD2DSS pair of the first terminal. There are many relative relationships between the PD2DSSS and the SD2DSS that are included in the D2DSS signal, and examples are only given here. All cases in which a D2D type is distinguished by using different relative positions are included in this embodiment.

(3) The D2D type and sequences of the PD2DSSS and/or the SD2DSS are in a one-to-one correspondence.

The PD2DSS and/or SD2DSS correspond or corresponds to a PSSID, and it may also be considered here that the D2D type and a PSSID group are in a one-to-one correspondence.

For simplicity of description, in the following example, sequences are different. Assuming that the PD2DSSS has M (positive integer) sequences, and the SD2DSS has N (positive integer) sequences, if one D2DSS includes one PD2DSS and one SSD2DSS, there are in total M*N possible different sequences, and if one D2DSS is a combination of multiple PD2DSSs and SSD2DSSs, there may be more than M*N possible different sequences. For example, if there are one PD2DSS and two SSD2DSSs, if the two SSD2DSSs transmit a same sequence, there are M*N sequences; and if the two SSD2DSSs transmit different sequences, there are M*N*N sequences. X (positive integer) sequences in all possible sequences are allocated to D2D discovery, and Y (positive integer) sequences in all possible sequences are allocated to D2D communication, where X+Y is less than or equal to a quantity of all the possible sequences. It may also be considered that X PSSIDs are allocated to D2D discovery, and Y PSSIDs are allocated to D2D communication.

(4) The foregoing solutions of the correspondence between the D2D type and the D2DSS may be used in combination.

In another embodiment, the D2D type and the PD2DSCH are in a one-to-one correspondence. Specifically, it may be any one of the following cases:

(1) A terminal of type D2D communication transmits a PD2DSCH, while a terminal of type D2D discovery does not transmit a PD2DSCH.

(2) The D2D type and a quantity of bits of PD2DSCH signaling are in a one-to-one correspondence. For example, a quantity of bits of the PD2DSCH transmitted by the first terminal when the D2D type is D2D communication is greater than a quantity of bits of the PD2DSCH transmitted by the first terminal when the D2D type is D2D discovery, or the case is opposite. Because the quantities of bits are different, quantities of time-frequency resources corresponding to the two PD2DSCHs may be different; or the quantities of time-frequency resources corresponding to the two PD2DSCHs are the same, and encoding rates are different.

(3) A quantity of bits of PD2DSCH signaling is the same, and information carried by the PD2DSCH includes one bit as a flag bit, which is used to distinguish whether the synchronization signal is transmitted by a terminal in D2D communication or is transmitted by a terminal in D2D discovery. For example, the bit of the PD2DSCH transmitted by the terminal in D2D communication is set to 1, while the bit of the PD2DSCH transmitted by the terminal in D2D discovery is set to 0; or the case is opposite.

(4) The D2D type and a frequency domain resource occupied by the PD2DSCH are in a one-to-one correspondence, and it may be a frequency domain resource position and/or a frequency domain resource quantity. For example, the PD2DSCH transmitted by a terminal in D2D communication is at a frequency domain position a; while the PD2DSCH transmitted by a terminal in D2D discovery is at a frequency domain position b. For another example, the PD2DSCH transmitted by the terminal in D2D communication occupies six RBs (resource block resource block, RB for short) at the frequency domain position a; and the PD2DSCH transmitted by the terminal in D2D discovery occupies eight RBs at the frequency domain position a. For another example, the PD2DSCH transmitted by the terminal in D2D communication occupies six RBs at the frequency domain position a; and the PD2DSCH transmitted by the terminal in D2D discovery occupies eight RBs at the frequency domain position b. The D2D type and a time-frequency domain resource of the PD2DSCH are in a one-to-one correspondence, and it may be a time-frequency domain resource position and/or a time-frequency domain resource quantity.

(5) The D2D type and a relative relationship between a time-frequency position of the PD2DSCH and a time-frequency position of the D2DSS are in a one-to-one correspondence. For example, the D2D type and a relative position between subframes in which the PD2DSCH and the D2DSS are located are in a one-to-one correspondence. For example, when the D2D type is D2D communication, the PD2DSCH and the D2DSS transmitted by the first terminal are in a same subframe; while when the D2D type is D2D discovery, the PD2DSCH and the D2DSS transmitted by the first terminal are not in a same subframe; or the case is opposite. For another example, when the D2D type is D2D communication, the PD2DSCH transmitted by first terminal is at a $p^{th}$ (p is 0 or a positive integer) subframe after the D2DSS; while when the D2D type is D2D discovery, the PD2DSCH transmitted by first terminal is at a $q^{th}$ (q is 0 or a positive integer) subframe after the D2DSS.

(6) The D2D type and a resource element mapping (Resource Element mapping) manner of the PD2DSCH are in a one-to-one correspondence. For example, when the D2D type is D2D communication, the PD2DSCH transmitted by the first terminal starts mapping from a first time symbol; while when the D2D type is D2D discovery, the PD2DSCH transmitted by the first terminal starts mapping from a second symbol.

(7) The foregoing solutions of transmitting the synchronization signal according to the D2D type and a corresponding PD2DSCH may be used in combination.

In an embodiment, the D2D type and the D2DSS and PD2DSCH are in a one-to-one correspondence. A specific implementation manner is as described above, and no further details are provided again.

The correspondence between the D2D type and the D2DSS and/or the PD2DSCH may be predefined, or may be configured by a base station, or a manner of combining predefining and configuration of a base station is used.

For example, sequences of the PD2DSSS and/or the SD2DSS transmitted by terminals of different D2D types are different. The sequence may be predefined into two types, one type used for D2D discovery, and the other type used for D2D communication. Which sequence or sequences are to be used specifically in a cell is configured for a base station. For example, that D2D communication uses a sequence 13 and D2D discovery uses a sequence 15 is directly configured for the base station, or the like; or there is a correspondence between a cell ID and sequences that are sent by D2D discovery and D2D communication. For example, for a cell whose cell ID is 9, D2D communication uses a synchronization sequence 13, and D2D discovery uses a synchronization sequence 15. It may be D2DSS signals whose PSSIDs are 13 and 15 separately, and the PSSID and the PD2DSSS and SD2DSS of the D2DSS are in a one-to-one correspondence.

Examples are given here only, and the present invention includes, but is not limited to, the examples.

In an implementation manner of the present invention, when the first terminal is inside a network coverage area, the first terminal transmits, on a resource configured by the system, the synchronization signal according to the determined D2D type.

In step 402, the D2D type and the resource configured by the system may be in a one-to-one correspondence; or the D2D type and the synchronization signal may be in a one-to-one correspondence; or the D2D type, the resource configured by the system, and the synchronization signal may be in a one-to-one correspondence. A case in which the D2D type and the synchronization signal are in a one-to-one correspondence has been described by using examples, and no further details are provided again herein and hereinafter.

When the first terminal has both a D2D discovery service and a D2D communication service, the first terminal may select, according to whether it is currently D2D discovery or D2D communication, a corresponding synchronization signal to transmit.

Step 402 may be specifically: transmitting, by the first terminal, according to the determined D2D type, a corresponding synchronization signal when transmitting data that corresponds to the D2D type. For example, when a terminal in D2D discovery transmits data of D2D discovery, the terminal in D2D discovery transmits a synchronization signal that corresponds to D2D discovery; when a terminal in D2D communication transmits data or signaling of D2D communication, the terminal in D2D communication transmits a synchronization signal that corresponds to D2D communication.

Step 402 may be specifically: transmitting, by the first terminal, on a corresponding resource configured by the system, the synchronization signal according to the determined D2D type. For example, a terminal in D2D discovery transmits, on a resource that is of D2D discovery and configured by the system, the synchronization signal; a terminal in D2D communication transmits, on a resource that is of D2D communication and configured by the system, the synchronization signal.

The resource configured by the system may be a time-frequency position of a resource pool of D2D discovery or D2D communication, and the first terminal may determine a time-domain position of the synchronization signal or a time-frequency position of the synchronization signal according to the time-frequency position of the resource pool. For example, if the D2D type is D2D discovery, the first terminal transmits the synchronization signal by default at a first subframe of a D2D discovery period; or if the D2D type is D2D communication, the first terminal transmits the synchronization signal by default at a first subframe of a scheduling assignment (Scheduling Assignment) period in D2D communication.

When the first terminal has both a D2D discovery service and a D2D communication service, the first terminal may select, according to whether it is D2D discovery or D2D communication currently, a corresponding synchronization signal to transmit on a corresponding resource configured by the system.

Step 402 may be specifically: transmitting, by the first terminal, according to the determined D2D type, on a corresponding resource configured by the system, a corresponding synchronization signal when transmitting data that corresponds to the D2D type. For example, a terminal in D2D discovery transmits, on a resource that is of D2D discovery and configured by the system in a D2D discovery period when the terminal transmits data of D2D discovery, a synchronization signal corresponding to D2D discovery; when a terminal in D2D communication transmits data of D2D communication, the terminal in D2D communication transmits, on a resource that is of D2D communication and configured by the system, a synchronization signal corresponding to D2D communication.

Step 402 specifically is: transmitting, by the first terminal, on a resource configured by the system, the synchronization signal according to the determined D2D type and system configuration.

The system configuration may include: the system configures that the first terminal transmits a synchronization signal.

Specifically, the system configures, in a manner of signaling notification, that the first terminal transmits a synchronization signal, and the first terminal transmits the synchronization signal according to the D2D type; where the signaling notification may be high-layer (for example, a Radio Resource Control radio resource control layer, RRC for short) and/or physical-layer broadcast signaling, and the signaling notification may be high-layer and/or physical-layer dedicated signaling.

Specifically, the system configures, in a manner of signaling notification, that the first terminal transmits a synchronization signal, and notifies a synchronization signal that corresponds to D2D discovery or a synchronization signal that corresponds to D2D communication.

When the first terminal has both a D2D discovery service and a D2D communication service, if the system configures to transmit a synchronization signal corresponding to D2D discovery and/or a synchronization signal corresponding to D2D communication, the first terminal may select, according to whether it is currently D2D discovery or D2D communication, a corresponding synchronization signal to transmit on a corresponding resource configured by the system.

Step 402 may be specifically: if the system configures that a corresponding synchronization signal is transmitted, transmitting, by the first terminal, on a corresponding resource configured by the system, the corresponding synchronization signal according to the determined D2D type when the terminal transmits data that corresponds to the D2D type. For example, a synchronization signal used for D2D discovery is transmitted on a resource that is of D2D discovery and configured by the system; a synchronization signal used for D2D communication is transmitted on a resource that is of D2D communication and configured by the system.

The first terminal transmits, on the resource configured by the system, the synchronization signal according to a predefined correspondence between a D2D type and a synchronization signal.

| D2D type | Synchronization signal type |
|---|---|
| D2D discovery | A |
| D2D communication | B |

In an embodiment, the first terminal transmits, on the resource configured by the system, the synchronization signal according to a correspondence between the D2D type and a cell identity and/or a physical synchronization source identity (Physical Synchronization Source Identity, PSSID for short) of a cell that the first terminal camps on, and a synchronization signal.

| Cell identity | D2D type | Synchronization signal type | Synchronization signal |
|---|---|---|---|
| X | D2D discovery | A | Ax |
|   | D2D communication | B | Bx |

| Physical synchronization source identity | D2D type | Synchronization signal type | Synchronization signal |
|---|---|---|---|
| Z | D2D discovery | A | Az |
|   | D2D communication | B | Bz |

| Cell identity | Physical synchronization source identity | D2D type | Synchronization signal type | Synchronization signal |
|---|---|---|---|---|
| X | Z | D2D discovery | A | Axz |
|   |   | D2D communication | B | Bxz |

In another embodiment, the first terminal transmits, on the resource configured by the system, the synchronization signal according to a correspondence between the D2D type, a cell identity of a cell that the first terminal camps on, and an identity of the first terminal and the synchronization signal.

| Cell identity | Device identity | D2D type | Synchronization signal type | Synchronization signal |
|---|---|---|---|---|
| X | Y | D2D discovery | A | Axy |
|   |   | D2D communication | B | Bxy |

The first terminal may transmit, on the resource configured by the system, the synchronization signal according to the D2D type and a corresponding synchronization signal configured by the system. For example, a synchronization signal, of D2D discovery, configured by the system is A, and a synchronization signal of D2D communication is B, and the first terminal then transmits, on a corresponding resource configured by the system, the corresponding synchronization signal according to the D2D type.

Step 402 may be specifically: transmitting, by the first terminal, according to the determined D2D type, on a corresponding resource configured by the system, the synchronization signal when transmitting data that corresponds to the D2D type. For example, a terminal in D2D discovery transmits, on a resource that is of D2D discovery and configured by the system in a D2D discovery period when the terminal transmits data of D2D discovery, a synchronization signal; when a terminal in D2D communication transmits data of D2D communication, the terminal in D2D communication transmits, on a resource that is of D2D communication and configured by the system, a synchronization signal.

In another implementation manner of the present invention, when the first terminal is outside a network coverage area, the first terminal transmits, on a pre-configured resource, the synchronization signal according to the determined D2D type.

In step 402, when the first terminal is outside the network coverage area, the D2D type and the pre-configured resource may be in a one-to-one correspondence; or the D2D type and the synchronization signal may be in a one-to-one correspondence; or the D2D type, the pre-configured resource, and the synchronization signal may be in a one-to-one correspondence.

In an exceptional case, in a cell, if multiple terminals are configured by a base station to transmit synchronization signals, when the D2D type is D2D discovery, corresponding terminals may all transmit same D2DSSs and/or PD2DSCHs. Similarly, when the D2D type is D2D communication, corresponding terminals may all transmit same D2DSSs and/or PD2DSCHs.

When a terminal detects a synchronization signal that is transmitted by a terminal of a different type, if the terminal gives up the current synchronization process and starts a next synchronization process, relatively slow synchronization acquisition is caused and subsequent communication is affected, and meanwhile, multiple times of signal processing also wastes more power.

Therefore, in another embodiment, to make a terminal outside the network coverage area in a scenario with partial network coverage to quickly acquire synchronization and network information, or to make a terminal inside the network coverage area in an inter-cell scenario to quickly acquire synchronization related information, if a terminal in a cell is configured by a base station to transmit a synchronization signal, when the D2D type is D2D discovery, a PD2DSCH transmitted by the terminal not only includes information for synchronization and/or communication for a terminal of a same D2D type, but also includes information for synchronization and/or communication for a terminal of another D2D type. For example, when the D2D type is D2D discovery, the PD2DSCH transmitted by the terminal includes information used for synchronization and/or D2D discovery for a terminal in D2D discovery, and also includes information used for synchronization and/or D2D communication for a terminal whose D2D type is D2D communication; or when the D2D type is D2D communication, the PD2DSCH transmitted by the terminal includes information used for synchronization and/or D2D communication for a terminal in D2D communication, and also includes information used for synchronization and/or D2D discovery for a terminal whose D2D type is D2D discovery.

When a terminal is configured by a base station to transmit a synchronization signal, corresponding to two D2D types, the terminal transmits information about a same PD2DSCH, where the information includes information used for D2D discovery, and also includes information used for D2D communication.

When a terminal is configured by a base station to transmit a synchronization signal, when the D2D type is D2D discovery, the terminal forwards information about a PD2DSCH corresponding to D2D communication; and when the D2D type is D2D communication, the terminal forwards information about a PD2DSCH corresponding to D2D discovery.

The terminal reads configuration information, of a system, corresponding to a current D2D type, and also needs to read configuration information, of a system, required for sending a PD2DSCH and corresponding to another D2D type. For example, a terminal of a D2D discovery type needs to read configuration information, of a system, required for sending the PD2DSCH and corresponding to D2D discovery and D2D communication, and sends the information in the PD2DSCH; a terminal of a D2D communication type needs to read configuration information, of a system, required for sending the PD2DSCH and corresponding to D2D communication and D2D discovery, and sends the information in the PD2DSCH.

In an embodiment, a method for transmitting a synchronization signal includes:

obtaining, by a first terminal, information about a synchronization signal corresponding to D2D discovery and information about a synchronization signal corresponding to D2D communication, where a D2D type of the first terminal is D2D discovery or D2D communication; and transmitting, by the first terminal, the synchronization signal.

Specifically, the information about the synchronization signal includes: information about a corresponding PD2DSCH when the D2D type is D2D discovery, and information about a corresponding PD2DSCH when the D2D type is D2D communication.

When the D2D type of the first terminal is D2D discovery, the first terminal obtains, from a base station, information about a corresponding PD2DSCH when the D2D type is D2D communication; or when the D2D type of the first terminal is D2D communication, the first terminal obtains, from a base station, information about a corresponding PD2DSCH when the D2D type is D2D discovery.

In another embodiment, a method for receiving a synchronization signal includes:

receiving, by a second terminal, a synchronization signal; and detecting, by the second terminal from the received synchronization signal according to a D2D type of the second terminal, a signal of information about a PD2DSCH corresponding to the current D2D type, and performing communication according to the information about the PD2DSCH.

A D2D type of the first terminal is D2D discovery or D2D communication.

Specifically, the synchronization signal includes: information about a corresponding PD2DSCH when the D2D type is D2D discovery, and information about a corresponding PD2DSCH when the D2D type is D2D communication.

By using the foregoing method, a D2D terminal can obtain information required for synchronization and/or subsequent communication, as long as the terminal detects a synchronization signal regardless of whether the synchronization signal is sent by a terminal of a same type, thereby accelerating synchronization and communication, and also reducing power for detecting repeatedly synchronization signals due to failed synchronization caused when a synchronization signal sent by a terminal of a different type is detected.

Corresponding to the foregoing method, in another embodiment, a terminal is provided, and the terminal includes:

a processor, which can execute, by invoking a program stored in a memory, the steps in the foregoing method for transmitting a synchronization signal or method for receiving a synchronization signal.

Figure 5:
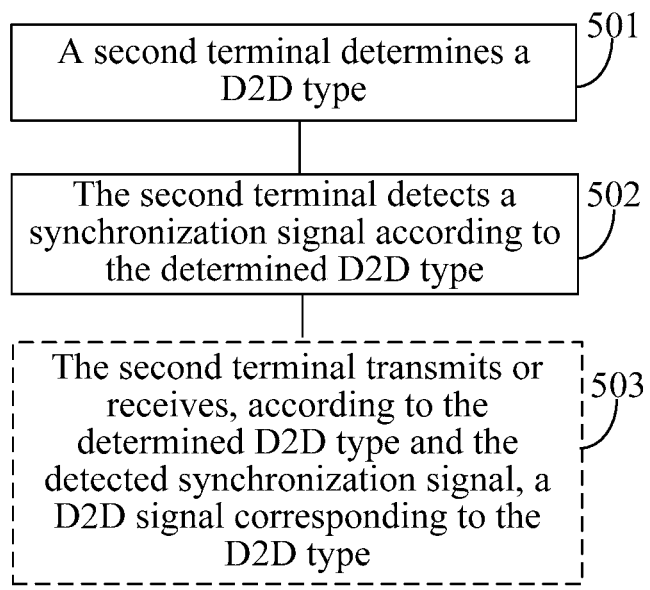
FIG. 5 is a schematic structural diagram of another method for receiving a synchronization signal according to an embodiment of the present invention.

FIG. 5 shows another method for receiving a synchronization signal according to an embodiment of the present invention. As shown in FIG. 5, the method includes:

501: A second terminal determines a D2D type.

The D2D type includes D2D discovery (discovery) and D2D communication (communication), and the second terminal may be inside a network coverage area or outside a network coverage area. A terminal may determine the D2D type according to a service type. For example, if the service type is a public security service, the terminal determines that the D2D type is D2D communication. If the service type is other business applications, the terminal may determine that the D2D type is D2D discovery. Certainly, the service type is only an example of the present invention, and the present invention includes, but is not limited to, the example. Alternatively, a user sets, according to an interest, a terminal to take part in D2D discovery and/or D2D communication; or a D2D type that the terminal takes part in is preset, or is selected randomly, or the like.

502: The second terminal detects and receives a synchronization signal according to the determined D2D type.

The D2D type and the synchronization signal are in a one-to-one correspondence. When the second terminal is inside the network coverage area, the second terminal detects a synchronization signal of an adjacent cell and/or a synchronization signal transmitted by a terminal that is outside the network coverage area; when the second terminal is outside the network coverage area, the second terminal detects a synchronization signal transmitted by a terminal that is inside the network coverage area and/or a synchronization signal transmitted by a terminal that is outside the network coverage area.

The synchronization signal includes a D2D synchronization signal (D2DSS) or a D2D synchronization signal and a physical D2D synchronization channel (PD2DSCH). The D2DSS further includes a primary D2D synchronization signal (PD2DSS) and a secondary D2D synchronization signal (SD2DSS). Certainly, this is only an example given in this embodiment of the present invention, and the synchronization signal in the present invention includes, but is not limited to, the foregoing example.

In an embodiment, the D2D type and the D2DSS are in a one-to-one correspondence. The D2DSS includes the PD2DSS and the SD2DSS, and therefore that the second terminal detects and receives a corresponding D2DSS according to the D2D type may be any one of the following cases:

(1) The D2D type and quantities of PD2DSSSs and SD2DSSs are in a one-to-one correspondence. For example, a terminal in D2D discovery detects and receives three PD2DSSSs and three SD2DSSs; and a terminal in D2D communication detects and receives two PD2DSSSs and two SD2DSSs. For another example, a terminal in D2D discovery detects and receives one PD2DSSS and two SD2DSSs; a terminal in D2D communication detects and receives two PD2DSSSs and three SD2DSSs. There are many possibilities for different quantities of PD2DSSSs and SD2DSSs, and examples are only given here. All relationships of one-to-one correspondences between the D2D type and the quantities of PD2DSSSs and/or SD2DSSs are included in this embodiment. The terminal performs detection according to the foregoing correspondence between the D2D type and the quantities of PD2DSSs and SD2DSSs. For example, a terminal in D2D discovery detects and receives the PD2DSS and SD2DSS having quantities corresponding to D2D discovery; a terminal in D2D communication detects and receives the PD2DSS and SD2DSS having quantities corresponding to D2D communication.

(2) The D2D type and a relative position of the detected and received PD2DSSS and SD2DSS are in a one-to-one correspondence: The D2D type and a quantity of time symbols between the PD2DSSS and the SD2DSS are in a one-to-one correspondence. For example, there are two time symbols between the PD2DSSS and the SD2DSS that are detected and received by a terminal in D2D discovery; there are three time symbols between the PD2DSSS and the SD2DSS that are detected by a terminal in D2D communication. Quantities of time symbols between the PD2DSSS and the SD2DSS of D2D discovery and D2D communication may be the same. If one PD2DSS and one SD2DSS form a PD2DSSS-SD2DSS pair, a quantity of time symbols between each PD2DSSS-SD2DSS pair detected by a terminal in D2D discovery is different from a quantity of time symbols between each PD2DSSS-SD2DSS pair detected by a terminal in D2D communication. For example, there are three symbols between each PD2DSSS-SD2DSS pair detected by the terminal in D2D discovery; there are five symbols between each PD2DSSS-SD2DSS pair detected by the terminal in D2D communication. There are many relative relations between the PD2DSSS and the SD2DSS that are included in the D2DSS signal, and examples are only given here. All cases in which the D2D type is distinguished by using different relative positions are included in this embodiment. The terminal performs detection according to the foregoing correspondence between a D2D type and of a relative position of the PD2DSSS and the SD2DSS. For example, a terminal in D2D discovery detects and receives the PD2DSSS and the SD2DSS having a relative position corresponding to D2D discovery; a terminal in D2D communication detects and receives the PD2DSSS and the SD2DSS having a relative position corresponding to D2D communication.

(3) The D2D type and sequences of the PD2DSSS and/or the SD2DSS are in a one-to-one correspondence. The PD2DSS and/or SD2DSS corresponds to a PSSID, and it may also be considered here that the D2D type and a PSSID group are in a one-to-one correspondence. For simplicity of description, in the following example, sequences are different. Assuming that the PD2DSSS has M sequences, and the SD2DSS has N sequences, if one D2DSS includes one PD2DSS and one SSD2DSS, there are in total M*N possible different sequences, and if one D2DSS is a combination of multiple PD2DSSs and SSD2DSSs, there may be more than M*N possible different sequences. For example, if there are one PD2DSS and 2 SSD2DSSs, if the 2 SSD2DSSs are of a same sequence, there are M*N sequences. If the 2 SSD2DSSs are of different sequences, there are M*N*N sequences. X sequences in all possible sequences are allocated to D2D discovery, and Y sequences in all possible sequences are allocated to D2D communication, where X+Y is less than or equal to a quantity of all the possible sequences. It may also be considered that X PSSIDs are allocated to D2D discovery, and Y PSSIDs are allocated to D2D communication. The terminal performs detection according to the foregoing correspondence between the D2D type and the D2DSS sequence. For example, a terminal in D2D discovery detects and receives X sequences corresponding to D2D discovery; a terminal in D2D communication detects and receives Y sequences corresponding to D2D communication.

(4) The foregoing solutions of the correspondence between the D2D type and the D2DSS may be used in combination.

In another embodiment, the D2D type and the PD2DSCH are in a one-to-one correspondence. The terminal detects and receives a corresponding PD2DSCH according to the D2D type may be any one of the following cases:

(1) The D2D type and existence of the PD2DSCH are in a one-to-one correspondence. For example, a terminal of type D2D communication detects and receives the PD2DSCH; while a terminal of type D2D discovery detects no PD2DSCH; or the case is opposite.

(2) The D2D type and a quantity of bits of PD2DSCH signaling are in a one-to-one correspondence. For example, a terminal in D2D communication detects and receives the PD2DSCH having a relatively large quantity of bits, while a terminal in D2D discovery detects and receives the PD2DSCH having a relatively small quantity of bits; or the case is opposite.

(3) A quantity of bits of PD2DSCH signaling is the same, and information carried by the PD2DSCH includes one bit as a flag bit, which is used to distinguish whether the synchronization signal is of D2D communication or of D2D discovery. For example, the bit of the PD2DSCH of D2D communication is set to 1, while the bit of the PD2DSCH of D2D discovery is set to 0; or the case is opposite. The terminal performs detection according to the foregoing correspondence between the D2D type and a flag bit in PD2DSCH signaling. The flag bit in the PD2DSCH detected and received by a terminal in D2D communication is 1, and it is considered that synchronization succeeds; the flag bit in the PD2DSCH detected and received by a terminal in D2D discovery is 0, and it is considered that synchronization succeeds.

(4) The D2D type and a frequency domain resource of the PD2DSCH are in a one-to-one correspondence, and it may be a frequency domain resource position and/or a frequency domain resource quantity. For example, the PD2DSCH detected and received by a terminal in D2D communication is at a frequency domain position a; while the PD2DSCH detected and received by a terminal in D2D discovery is at a frequency domain position b. For another example, the PD2DSCH detected and received by the terminal in D2D communication occupies six RBs at the frequency domain position a; the PD2DSCH detected and received by the terminal in D2D discovery occupies eight RBs at the frequency domain position a. For another example, the PD2DSCH detected and received by the terminal in D2D communication occupies six RBs at the frequency domain position a; the PD2DSCH detected and received by the terminal in D2D discovery occupies eight RBs at the frequency domain position b. The D2D type and a time-frequency domain resource of the PD2DSCH are in a one-to-one correspondence, and it may be a time-frequency domain resource position and/or a time-frequency domain resource quantity.

The terminal performs detection according to the foregoing correspondence between the D2D type and a time-frequency domain resource position and/or a time-frequency domain resource quantity of the PD2DSCH.

(5) The D2D type and a relative relationship between a time-frequency position of the PD2DSCH and a time-frequency position of the D2DSS are in a one-to-one correspondence. The D2D type and a relative position between subframes in which the D2DSS and the PD2DSCH are located are in a one-to-one correspondence. For example, the PD2DSCH and the D2DSS detected and received by a terminal in D2D communication are in a same subframe; while the PD2DSCH and the D2DSS detected and received by a terminal in D2D discovery are not in a same subframe; or the case is opposite. For another example, the PD2DSCH detected and received by the terminal in D2D communication is at a $p^{th}$ (p is 0 or a positive integer) subframe after the D2DSS; while the PD2DSCH detected and received by the terminal in D2D discovery is at a $q^{th}$ (q is 0 or a positive integer) subframe after the D2DSS.

The terminal performs detection according to the D2D type and the relative relationship between a time-frequency position of the PD2DSCH and a time-frequency position of the D2DSS.

(6) The D2D type and a time-frequency mapping manner of the PD2DSCH are in a one-to-one correspondence.

The PD2DSCHs detected and received by terminals of different D2D types have different mapping manners. For example, a terminal in D2D communication detects and receives the PD2DSCH from a first time symbol; while a terminal in D2D discovery detects and receives the PD2DSCH from a second symbol.

(7) The foregoing solutions of detecting and receiving a corresponding PD2DSCH according to the D2D type may be used in combination.

In an embodiment, the terminal detects and receives a corresponding D2DSS and PD2DSCH according to the D2D type. A specific implementation manner is as described above, and no further details are provided again.

The correspondence between the D2D type and the D2DSS and/or the PD2DSCH may be predefined, or may be configured by a base station, or a manner of combining predefining and configuration of a base station is used.

For another example, the D2D type and sequences of the PD2DSSS and/or the SD2DSS are in a one-to-one correspondence. The sequence may be predefined into two types, one type used for D2D discovery, and the other type used for D2D communication. Which sequence or sequences are to be used specifically in a cell is configured by a base station. For example, the base station configures directly that D2D communication uses a sequence 13 and D2D discovery uses a sequence 15, or the like; or there is a correspondence between a cell ID and sequences that are sent by D2D discovery and D2D communication. For example, for a cell whose cell ID is 9, D2D communication uses a synchronization sequence 13, and D2D discovery uses a synchronization sequence 15. It may also be D2DSS signals whose PSSIDs are 13 and 15 separately, and the PSSID and the PD2DSSS and SD2DSS of the D2DSS are in a one-to-one correspondence.

Examples are given here only, and the present invention includes, but is not limited to, the examples.

The second terminal detects and receives the synchronization signal according to a predefined relationship between a D2D type and a synchronization signal.

| D2D type | Synchronization signal type |
|---|---|
| D2D discovery | A |
| D2D communication | B |

In this case, when the D2D type of the second terminal is D2D discovery, the second terminal detects all synchronization signals corresponding to D2D discovery; when the D2D type of the second terminal is D2D communication, the second terminal detects all synchronization signals corresponding to D2D communication. Next, N (N is a positive integer) signals in all the synchronization signals are selected according to a decision principle. The decision principle may be strength of a received signal, a synchronization signal whose received energy exceeds a threshold, a priority level of a synchronization signal, and the like. N and a received energy threshold may be configured by the system or predefined.

Examples are given here only, and the present invention includes, but is not limited to, the examples.

In an embodiment, when the second terminal is under network coverage, the second terminal detects and receives the synchronization signal according to a correspondence between the D2D type and a cell identity of an adjacent cell and a synchronization signal.

| Cell identity | D2D type | Synchronization signal type | Synchronization signal |
|---|---|---|---|
| X | D2D discovery | A | Ax |
|   | D2D communication | B | Bx |

| Cell identity | D2D type | Synchronization signal type | Synchronization signal |
|---|---|---|---|
| Y | D2D discovery | A | Ay |
|   | D2D communication | B | By |

In an embodiment, when the second terminal is under network coverage, the second terminal detects the synchronization signal according to a correspondence between the D2D type and the PSSID configured by an adjacent cell and a synchronization signal.

Further, the synchronization signal may be a synchronization signal transmitted by a terminal in D2D discovery or D2D communication that is inside the network coverage area; or a synchronization signal transmitted by a terminal in D2D discovery or D2D communication that is outside the network coverage area.

In an embodiment, when the second terminal is under network coverage, the second terminal detects and receives the synchronization signal transmitted by a terminal that is inside the network coverage area, and detects and receives the synchronization signal according to a correspondence between the D2D type and a configuration of an adjacent cell. The adjacent cell configures a resource of the synchronization signal. The resource configured by the adjacent cell refers to a time-frequency position of a resource pool of D2D discovery or D2D communication, and the second terminal determines a time-domain or time-frequency position of a corresponding synchronization signal according to the time-frequency position of the resource pool. For example, for a resource of D2D discovery, the synchronization signal is transmitted by default at a first subframe of a discovery period; or the synchronization signal is transmitted by default at a first subframe of a scheduling assignment (Scheduling Assignment) period of D2D communication, or the like. The second terminal detects and receives the synchronization signal on the resource configured by the adjacent cell.

For example, a terminal in D2D communication detects and receives the synchronization signal on a resource that is configured by the adjacent cell and of D2D communication; a terminal in D2D discovery detects and receives the synchronization signal on a resource that is configured by the adjacent cell and of D2D discovery.

In step 502, the D2D type and a configuration resource of the adjacent cell may be in a one-to-one correspondence; or the D2D type and the synchronization signal may be in a one-to-one correspondence; or the D2D type, the configuration resource of the adjacent cell, and the synchronization signal may be in a one-to-one correspondence. A case in which the D2D type and the synchronization signal are in a one-to-one correspondence has been described by examples, and no further details are provided again herein and hereinafter.

When the second terminal has both a D2D discovery service and a D2D communication service, the second terminal may select, according to whether it is D2D discovery or D2D communication currently, a corresponding synchronization signal to detect and receive.

In an embodiment, when the second terminal is outside network coverage, the second terminal detects and receives the synchronization signal transmitted by a terminal that is inside the network coverage area, and detects and receives the synchronization signal according to the D2D type and a correspondence configured by the system. The system configures a resource of the synchronization signal. The resource configured by the system refers to a time-frequency position of a resource pool of D2D discovery or D2D communication, and the second terminal determines a time-domain or time-frequency position of a corresponding synchronization signal according to the time-frequency position of the resource pool. For example, for a resource of D2D discovery, the synchronization signal is transmitted by default at a first subframe of a discovery period; or the synchronization signal is transmitted by default at a first subframe of a scheduling assignment (Scheduling Assignment) period of D2D communication, or the like. The second terminal detects and receives the synchronization signal on the resource configured by the system.

For example, a terminal in D2D communication detects and receives the synchronization signal on a resource that is configured by the system and of D2D communication configuration; a terminal in D2D discovery detects and receives the synchronization signal on a resource that is configured by the system and of D2D discovery configuration.

In step 502, the D2D type and a configuration resource configured by the system may be in a one-to-one correspondence; or the D2D type and a synchronization signal may be in a one-to-one correspondence; or the D2D type, the configuration resource configured by the system, and a synchronization signal may be in a one-to-one correspondence.

When the second terminal has both a D2D discovery service and a D2D communication service, the first terminal may select, according to whether it is D2D discovery or D2D communication currently, a corresponding synchronization signal to detect and receive. For example, a synchronization signal used for D2D discovery is detected and received on a resource that is of D2D discovery and configured by the system; a synchronization signal used for D2D communication is detected and received on a resource that is of D2D communication and configured by the system.

In an embodiment, when the second terminal is under network coverage, the second terminal detects and receives the synchronization signal according to a correspondence between the D2D type and a configuration of the adjacent cell and a timing difference between a current cell and the adjacent cell. The configuration of the adjacent cell includes a resource of the synchronization signal. The timing difference refers to that when the system is asynchronous, timing of different cells is not consistent, and a difference exists. A value of the timing difference is not limited. The timing difference may be quantified into a frame (frame), a subframe (subframe), and a time symbol (symbol) for measurement. For example, it is notified that a timing difference between an adjacent cell A and a current cell is ±2 subframes/+2 subframes/−2 subframes, and then the terminal starts to detect and receive the synchronization signal according to the D2D type and from 2 subframes before and after/before/after a found resource of synchronization signal, configured by the adjacent cell, corresponding to the D2D type.

The configuration of the adjacent cell may also refer to a time-frequency position of a resource pool of D2D discovery or D2D communication, and the second terminal may determine a time-domain position of the synchronization signal or a time-frequency position of the synchronization signal according to the time-frequency position of the resource pool. For example, if the D2D type is D2D discovery, the second terminal performs detection and receiving by default at a position at which a first subframe of a D2D discovery period is the resource of the synchronization signal; or if the D2D type is D2D communication, the second terminal performs detection and receiving by default at a position at which a first subframe of a scheduling assignment (SA) period in D2D communication is the resource of the synchronization signal.

When the second terminal has both a D2D discovery service and a D2D communication service, the second terminal selects, according to whether it is D2D discovery or D2D communication currently, a corresponding synchronization signal to detect and receive.

(503) The second terminal transmits or receives, according to the determined D2D type and the detected and received synchronization signal, a signal corresponding to the D2D type.

For example, a terminal in D2D discovery detects and receives a synchronization signal of D2D discovery, and then receives and/or transmits a signal of D2D discovery on a corresponding resource; a terminal in D2D communication detects and receives a synchronization signal of D2D communication, and then transmits and/or receives a signal of D2D communication on a corresponding resource according to information about a PD2DSCH. The D2DSS may be predefined to appear at a first frame of a D2D discovery period; or the D2DSS may be predefined to appear at a first frame of a D2D communication SA period.

Figure 6:
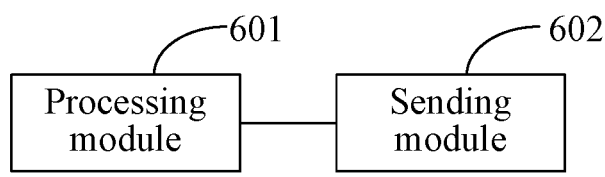
FIG. 6 is a schematic structural diagram of an apparatus for transmitting a synchronization signal according to an embodiment of the present invention.

FIG. 6 shows an apparatus for transmitting a synchronization signal according to an embodiment of the present invention. The apparatus may be used to execute the methods shown in FIG. 2 and FIG. 4. As shown in FIG. 6, the apparatus includes:

a processing module 601, configured to determine a D2D type, where the D2D type includes D2D discovery and D2D communication; and a sending module 602, configured to transmit a synchronization signal according to the D2D type determined by the processing module.

Figure 6A:
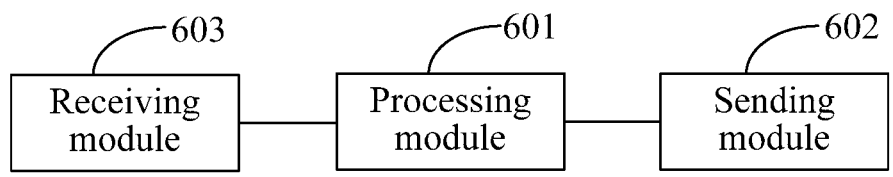
FIG. 6a is a schematic structural diagram of another apparatus for transmitting a synchronization signal according to an embodiment of the present invention.

Further, as shown in FIG. 6a, the apparatus further includes:

a receiving module 603, configured to: when the apparatus is inside a network coverage area, receive configuration information of a system, where the configuration information includes resource information that is configured by the system and of the synchronization signal, and an indication for sending the synchronization signal.

The sending module is specifically configured to: when the configuration information includes the indication for sending the synchronization signal, transmit, on a resource that is configured by the system and of the synchronization signal, the synchronization signal according to a correspondence between the D2D type determined by the processing module and the resource that is configured by the system and of the synchronization signal.

The sending module is specifically configured to: when the configuration information includes the indication for sending the synchronization signal, transmit, on a resource that is configured by the system and of the synchronization signal, the synchronization signal according to a correspondence between the D2D type determined by the processing module and a synchronization signal.

The sending module is specifically configured to: when the configuration information includes the indication for sending the synchronization signal, transmit, on a resource that is configured by the system and of the synchronization signal, the synchronization signal according to a correspondence between the D2D type determined by the processing module and the resource that is configured by the system and of the synchronization signal and a synchronization signal.

The synchronization signal sent by the sending module includes:

a D2D synchronization signal; or a D2D synchronization signal and a physical D2D synchronization channel;

where the D2D synchronization signal includes a primary D2D synchronization signal and a secondary D2D synchronization signal.

It should be particularly noted that, in this embodiment of the present invention, a physical apparatus corresponding to the receiving module may be a receiver, a physical apparatus corresponding to the processing module may be a processor, and a physical apparatus corresponding to the sending module may be a transmitter.

Compared with the prior art, in this embodiment of the present invention, synchronization signals transmitted by terminals of different D2D types do not affect each other. This avoids that a second terminal detects and receives a synchronization signal that does not correspond to a D2D type of the second terminal, and therefore avoids that when performing user direct-connection communication subsequently, the second terminal transmits or receives a D2D signal of a wrong D2D type, improves efficiency of user direct-connection communication, reduces detection complexity of the second terminal, reduces detection power of the second terminal, and ensures that user direct-connection communication can be performed correctly and efficiently.

Figure 7:
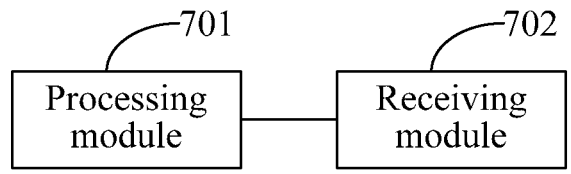
FIG. 7 is a schematic structural diagram of an apparatus for receiving a synchronization signal according to an embodiment of the present invention.
Figure 7A:
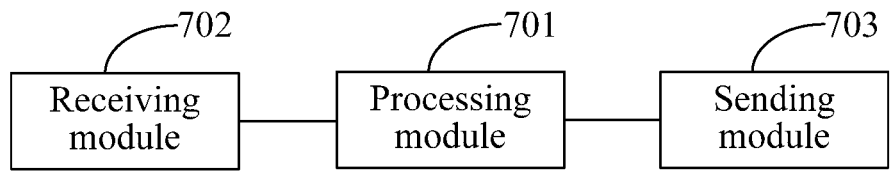
FIG. 7a is a schematic structural diagram of another apparatus for receiving a synchronization signal according to an embodiment of the present invention.

FIG. 7 shows an apparatus for receiving a synchronization signal according to an embodiment of the present invention. The apparatus may be used to execute the methods shown in FIG. 3 and FIG. 5. As shown in FIG. 7, the apparatus includes:

a processing module 701, configured to determine a D2D type, where the D2D type includes D2D discovery and D2D communication; and a receiving module 702, configured to detect and receive a synchronization signal according to the D2D type determined by the processing module.

The receiving module is specifically configured to:

when the apparatus is inside a network coverage area, detect and receive a synchronization signal of an adjacent cell and/or a synchronization signal transmitted by a terminal that is outside the network coverage area; or when the apparatus is outside a network coverage area, detect and receive a synchronization signal transmitted by a terminal that is inside the network coverage area and/or a synchronization signal transmitted by a terminal that is outside the network coverage area.

Further, the receiving module is further configured to: receive resource information that is configured by a system of the adjacent cell and of the synchronization signal.

Further, the apparatus further includes:

a sending module 703, configured to transmit, according to the D2D type determined by the processing module and the detected and received synchronization signal, a signal corresponding to the D2D type; or the receiving module, further configured to receive, according to the D2D type determined by the processing module and the detected and received synchronization signal, a signal corresponding to the D2D type.

The synchronization signal received by the receiving module includes:

a D2D synchronization signal; or a D2D synchronization signal and a physical D2D synchronization channel;

where the D2D synchronization signal includes a primary D2D synchronization signal and a secondary D2D synchronization signal.

The receiving module is specifically configured to: when inside the network coverage area, detect and receive the synchronization signal according to the determined D2D type, a cell identity of the adjacent cell, and a correspondence between the cell identity of the adjacent cell and a synchronization signal.

The receiving module is specifically configured to: when inside the network coverage area, detect and receive the synchronization signal according to the determined D2D type and an identity of the synchronization signal of the adjacent cell.

It should be particularly noted that, in this embodiment of the present invention, a physical apparatus corresponding to the receiving module may be a receiver, a physical apparatus corresponding to the processing module may be a processor, and a physical apparatus corresponding to the sending module may be a transmitter.

Compared with the prior art, in this embodiment of the present invention, synchronization signals transmitted by terminals of different D2D types do not affect each other. This avoids that a second terminal detects and receives a synchronization signal that does not correspond to a D2D type of the second terminal, and therefore avoids that when performing user direct-connection communication subsequently, the second terminal transmits or receives a D2D signal of a wrong D2D type, improves efficiency of user direct-connection communication, reduces detection complexity of the second terminal, reduces detection power of the second terminal, and ensures that user direct-connection communication can be performed correctly and efficiently.

In a working scenario with partial network coverage, discovery and/or communication between terminals inside and outside a network coverage area can be implemented in a more effective way, and difficulty for connection between users inside and outside the network coverage area is reduced. Meanwhile, inter-cell (inter-cell) discovery and/or communication between terminals under network coverage can be implemented in a more effective way.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a synchronization signal, comprising:

determining, by a first terminal, a device to device (D2D) type, wherein the D2D type comprises D2D discovery and D2D communication; and transmitting, by the first terminal, a synchronization signal according to the determined D2D type.

2. The method according to claim 1, wherein the method further comprises:

when the first terminal is inside a network coverage area, receiving, by the first terminal, configuration information of a system, wherein the configuration information comprises resource information that is configured by the system and of the synchronization signal, and an indication for sending the synchronization signal.

3. The method according to claim 2, wherein when the configuration information comprises the indication for sending the synchronization signal, the transmitting, by the first terminal, a synchronization signal according to the D2D type comprises:

transmitting, by the first terminal, on a resource that is configured by the system and of the synchronization signal, the synchronization signal according to a correspondence between the determined D2D type and a synchronization signal.

4. The method according to claim 1, wherein transmitting, by the first terminal, a synchronization signal according to the determined D2D type comprises:
   transmitting a physical D2D synchronization channel (PD2DSCH) if the first terminal is of type D2D communication, not transmitting a PD2DSCH if the first terminal is of type D2D discovery.

5. The method according to claim 1, wherein the synchronization signal comprises:
   a D2D synchronization signal; or
   a D2D synchronization signal and a physical D2D synchronization channel;
   wherein the D2D synchronization signal comprises a primary D2D synchronization signal and a secondary D2D synchronization signal.

6. A method for receiving a synchronization signal, comprising:
   determining, by a second terminal, a device to device (D2D) type, wherein the D2D type comprises D2D discovery and D2D communication; and
   detecting and receiving, by the second terminal, a synchronization signal according to the determined D2D type.

7. The method according to claim 6, wherein the detecting and receiving, by the second terminal, a synchronization signal according to the determined D2D type comprises:
   when the second terminal is inside a network coverage area, detecting and receiving a synchronization signal of an adjacent cell and/or a synchronization signal transmitted by a terminal that is outside the network coverage area; or
   when the second terminal is outside a network coverage area, detecting and receiving a synchronization signal transmitted by a terminal that is inside the network coverage area and/or a synchronization signal transmitted by a terminal that is outside the network coverage area.

8. The method according to claim 6, wherein the detecting and receiving, by the second terminal, a synchronization signal according to the determined D2D type comprises:
   detecting and receiving a physical D2D synchronization channel (PD2DSCH) if the second terminal is of type D2D communication; detecting no PD2DSCH if the second terminal of type D2D discovery.

9. The method according to claim 6, wherein the synchronization signal comprises:
   a D2D synchronization signal; or
   a D2D synchronization signal and a physical D2D synchronization channel;
   wherein the D2D synchronization signal comprises a primary D2D synchronization signal and a secondary D2D synchronization signal.

10. The method according to claim 6, wherein the detecting and receiving, by the second terminal, a synchronization signal according to the determined D2D type comprises:
    detecting and receiving, by the second terminal, the synchronization signal according to a predefined correspondence between a D2D type and a synchronization signal.

11. An apparatus for transmitting a synchronization signal, comprising:
    a processor, configured to determine a device to device (D2D) type, wherein the D2D type comprises D2D discovery and D2D communication; and
    a transmitter, configured to transmit a synchronization signal according to the D2D type determined by the processing module.

12. The apparatus according to claim 11, wherein the apparatus further comprises:
    a receiver, configured to: when the apparatus is inside a network coverage area, receive configuration information of a system, wherein the configuration information comprises resource information that is configured by the system and of the synchronization signal, and an indication for sending the synchronization signal.

13. The apparatus according to claim 12, wherein the transmitter is configured to:
    when the configuration information comprises the indication for sending the synchronization signal, transmit, on a resource that is configured by the system and of the synchronization signal, the synchronization signal according to a correspondence between the D2D type determined by the processing module and a synchronization signal.

14. The apparatus according to claim 11, wherein the transmitter, is configured to:
    transmit a physical D2D synchronization channel (PD2DSCH) if the apparatus is of type D2D communication, not transmit a PD2DSCH if the apparatus is of type D2D discovery.

15. The apparatus according to claim 11, wherein the synchronization signal sent by the transmitter comprises:
    a D2D synchronization signal; or
    a D2D synchronization signal and a physical D2D synchronization channel;
    wherein the D2D synchronization signal comprises a primary D2D synchronization signal and a secondary D2D synchronization signal.

16. An apparatus for receiving a synchronization signal, comprising:
    a processor, configured to determine a device to device (D2D) type, wherein the D2D type comprises D2D discovery and D2D communication; and
    a receiver, configured to detect and receive a synchronization signal according to the D2D type determined by the processing module.

17. The apparatus according to claim 16, wherein the receiver is configured to:
    when the apparatus is inside a network coverage area, detect and receive a synchronization signal of an adjacent cell and/or a synchronization signal transmitted by a terminal that is outside the network coverage area; or
    when the apparatus is outside a network coverage area, detect and receive a synchronization signal transmitted by a terminal that is inside the network coverage area and/or a synchronization signal transmitted by a terminal that is outside the network coverage area.

18. The apparatus according to claim 16, wherein the receiver is configured to:
    detect and receive the physical D2D synchronization channel (PD2DSCH) if the apparatus is of type D2D communication; detect no PD2DSCH if the second terminal of type D2D discovery.

19. The apparatus according to claim 16, wherein the apparatus further comprises:
    a transmitter, configured to transmit, according to the D2D type determined by the processing module and the detected and received synchronization signal, a signal corresponding to the D2D type; or
    the receiver, further configured to receive, according to the D2D type determined by the processing module and the detected and received synchronization signal, a signal corresponding to the D2D type.

20. The apparatus according to claim 16, wherein the synchronization signal received by the receiver comprises:
   a D2D synchronization signal; or
   a D2D synchronization signal and a physical D2D synchronization channel;
   wherein the D2D synchronization signal comprises a primary D2D synchronization signal and a secondary D2D synchronization signal.

21. A non-transitory computer readable storage medium, comprising computer program codes which when executed by a computer processor cause the compute processor to execute the steps of:
   determining a device to device (D2D) type, wherein the D2D type comprises D2D discovery and D2D communication; and
   instructing a transmitter to transmit, a physical D2D synchronization channel (PD2DSCH) if the first terminal is of type D2D communication, not transmitting a PD2DSCH if the first terminal is of type D2D discovery.

22. A non-transitory computer readable storage medium, comprising computer program codes which when executed by a computer processor cause the compute processor to execute the steps of:
   determining a device to device (D2D) type, wherein the D2D type comprises D2D discovery and D2D communication; and
   instructing a receiver to detect and receive, a physical D2D synchronization channel (PD2DSCH) if the second terminal is of type D2D communication; detecting no PD2DSCH if the second terminal of type D2D discovery.

* * * * *